United States Patent [19]

Holmquist

[11] 4,322,300

[45] Mar. 30, 1982

[54] DRILLING FLUID

[75] Inventor: Howard W. Holmquist, Bellingham, Wash.

[73] Assignee: Georgia-Pacific Corporation, Portland, Oreg.

[21] Appl. No.: 153,608

[22] Filed: May 27, 1980

[51] Int. Cl.$^3$ ............................................. C09K 7/02
[52] U.S. Cl. ............................ 252/8.5 C; 252/8.55 R; 525/491; 525/505; 528/150; 528/155
[58] Field of Search ............. 252/8.5 A, 8.5 C, 8.55 R

[56] References Cited

U.S. PATENT DOCUMENTS

| | | | |
|---|---|---|---|
| 2,560,380 | 7/1951 | Wrightsman | 252/8.5 |
| 2,649,414 | 8/1953 | Salathiel | 252/8.5 |
| 2,681,312 | 6/1954 | Salathiel | 252/8.5 |
| 3,214,373 | 10/1965 | Adolphson | 252/8.5 |
| 3,956,140 | 5/1976 | Nahm et al. | 252/8.5 |

*Primary Examiner*—Herbert B. Guynn
*Attorney, Agent, or Firm*—Schuyler, Banner, Birch, McKie & Beckett

[57] ABSTRACT

A water-base well drilling, workover or completion fluid containing a fluid loss control agent prepared by pre-reacting sulfonated phenol with formaldehyde under alkaline conditions and then reacting the mixture with phenol under controlled conditions is described.

19 Claims, No Drawings

DRILLING FLUID

This invention pertains to water-base well drilling, workover or completion fluid containing a particular fluid loss control agent.

In a drilling operation, such as rotary drilling, a drilling fluid is circulated in the wellbore which performs a number of functions. The drilling fluid employed usually is an aqueous drilling fluid and is compounded with various materials in order to impart desired physical and chemical properties to the fluid. One class of wellbore fluid commonly used is aqueous drilling fluids containing a clayey material to impart the desired viscosity and gel strength to the drilling fluid. Other materials, such as weighting agents, dispersants or thinners, corrosion inhibitors, bacteriacides, fluid loss control agents, and other agents, are also usually incorporated. Some of these agents may impart more than one desirable property to the fluid. For example, the heavy metal lignosulfonate, such as those described in U.S. Pat. No. 2,935,473, are effective thinners and, when used in larger amounts, also function as fluid loss control agents reducing the filtration rate of the aqueous base into the formation being drilled. While the lignosulfonates and other additives may function satisfactorily both as thinners and water loss agents for many drilling fluids, other additives are often used for fluid loss control for particular drilling fluids such as, for example, saturated salt drilling fluids. Starches, starch derivatives and water-soluble gums including derivatives of cellulose, such as sodium carboxymethyl cellulose and hydroxymethyl cellulose, may have or may be modified to have sufficient solubility in saturated salt drilling fluids to be effective in reduction of fluid loss. However, these materials generally greatly increase the viscosity of the drilling fluid which is undesirable, and are not sufficiently thermally stable under the high pressures and temperatures which may be encountered in drilling of deeper wells.

Sulfonated phenol-formaldehyde condensation products and sulfomethylated phenol condensation products are disclosed for use as fluid loss control agents in U.S. Pat. Nos. 2,681,312 and 3,956,140, respectively. While the above products are effective in many muds, they are not satisfactory for particular muds such as, for example, saturated salt drilling fluids, especially under high temperature and pressure.

It is, therefore, an object of this invention to provide a water-base drilling fluid containing an effective fluid loss agent. Another object is to provide a water-base drilling fluid containing a fluid loss control agent which is effective under high temperature and pressure. A further object is to provide a drilling, workover or completion fluid characterized by having effective fluid loss properties for most aqueous drilling fluids, especially saturated salt muds or drilling fluids.

The above and other objects are attained by this invention by a water-base drilling, workover or completion fluid comprising a suspension of clayey material in an aqueous medium and an effective amount of fluid loss control agent prepared by pre-reacting phenol sulfonic acid with formaldehyde under controlled alkaline conditions and then reacting the pre-reacted mixture with from 0.5 to 0.7 moles of phenol per mole of the pre-reacted phenol sulfonic acid in presence of some free or unreacted formaldehyde under alkaline conditions as noted hereafter. The resulting fluid loss control agent obtained is effective in most water-base, clay-containing drilling fluids including sea water and saturated salt drilling fluids. The fluid loss control agent is also effective for substantially clear workover or completion fluids, such as a sodium chloride brine, as long as the well has been drilled with a clay-containing drilling fluid to deposit a clay-containing layer within the well.

In preparation of the fluid loss control agent, phenol sulfonic acid is pre-reacted with formaldehyde such that from about 0.9 to 1.3 moles of formaldehyde is reacted with each mole of phenol sulfonic acid. The pre-reaction is carried out under alkaline conditions with the pH in the range of from 8 to 9.5. The reaction temperature may be widely varied in the range conventionally used in phenol-formaldehyde type reactions. A practical range is from 70° to 105° C., preferably from 85° to 105° C. or reflux. A reaction time of about from 2 to 8 hours may be usually required to obtain the desired extent of reaction of the formaldehyde with the phenol sulfonic acid. At the higher reaction temperature, the reaction time may be decreased to about 4 to 6 hours. For the pre-reaction, from 0.9 to 1.3 moles of formaldehyde per mole of phenol sulfonic acid may be added and the reaction carried out until substantially all of the formaldehyde has reacted. However, if desired all of the formaldehyde used in the total reaction, which generally is in the range of 1 to 1.6 moles of formaldehyde per mole of the combined moles of phenol sulfonic acid and phenol used, may be added to the phenol sulfonic acid in the pre-reaction step. With an excess of formaldehyde, the rate of reaction is a little faster and after the desired extent of reaction of the phenol sulfonic acid with the formaldehyde is obtained, phenol may be then added to the mixture and the reaction continued in presence of the unreacted formaldehyde and additional alkali until a cloud point is obtained at a pH in the range of 10 to 11. When a limited amount of formaldehyde is used initially in the pre-reaction with the phenol sulfonic acid, additional formaldehyde is added with the phenol and the reaction continued. Preferably the reaction is continued until the major portion of the free or unreacted formaldehyde has reacted, which generally may require a reaction time of from $\frac{1}{4}$ to 2 hours, most often $\frac{1}{2}$ to 1 hour, before the addition of additional alkali is made to obtain a pH in the range of 10 to 11, preferably 10.2 to 10.8. Generally the additional alkali is added after the major portion of the free formaldehyde has reacted to minimize the loss of formaldehyde by Cannizzaro reaction obtained at the higher pH. The additional alkali may be gradually added continuously or added in periodic increments. After the addition of the alkali or caustic, the reaction is continued until a cloud point is obtained, requiring generally a reaction time of from about $\frac{1}{4}$ to 2 hours. After the cloud point is obtained, more alkali is added to obtain a pH in the range of 11 to 12, preferably at least 11.2, and the reaction continued until the viscosity of the final reaction mixture is at least 30 cps at 25° C. for the mixture at a solids concentration of about 45 to 50%. Generally a reaction time of from about 6 to 50 hours may be required for this step.

The extent of polymerization obtained in the reaction is primarily effected by the amount of phenol reacted with the prereacted phenol sulfonic acid and secondarily by the amount of formaldehyde used. When an insufficient amount of phenol is used in the reaction, sufficient polymerization is not obtained to develop the required molecular weight for the resin to be effective for fluid loss control. On the other hand, if the amount of phenol added is too high, the molecular weight will advance too far and the resin will become insoluble. Sufficient formaldehyde must be used so that no significant amount of free phenol remains after the reaction is completed. Within the above mole ratio range of formaldehyde, the rate of reaction is such that the desired extent of polymerization is generally obtained in a reasonable time and the reaction is sufficiently advanced to a point where the product is still soluble and is stable for the extended periods of storage which may be expected. Preferably, the amount of formaldehyde used is in a ratio in the range of 1.1 to 1.3 moles per mole of phenol sulfonic acid and phenol. With some commercial grades of reactants, a somewhat higher ratio of formaldehyde may be desirable to allow for the formaldehyde which may be lost in reaction with some of the impurities. With large excesses of formaldehyde, the reaction may continue during resin storage and the polymer may not have the desired stability. Addition of formaldehyde in limited amounts may be made to the reaction mixture after the last addition of the caustic or at the high pH, especially if the amount of formaldehyde used initially in the reaction with the phenol sulfonic acid and phenol was in the lower range and exceedingly long reaction time is being required to obtain the desired extent of polymerization. A small portion of formaldehyde in an amount of from about 10% to 20% of the formaldehyde used may be reserved or additionally added at this stage to hasten the reaction. The additions are preferably made slowly at this time to better utilize the formaldehyde in the polymerization. The addition or presence of a small excess of formaldehyde is not critical, as long as the reaction is continued long enough at this stage so that the formaldehyde not utilized in the polymerization is converted to relatively non-reactive products through the Cannizzaro reaction at the high pH without the product advancing too far or becoming insoluble.

In the overall reaction, generally the total amount of alkali used is in a range of from about 0.5 to 0.75 moles per mole of phenol plus phenol sulfonic acid sodium salt. Caustic or sodium hydroxide is most commonly used but other alkali metal hydroxides conventionally used in phenol-formaldehyde type reactions may also be employed.

The final product may be used as obtained as a liquid or spray dried. Prior to spray drying or storage, it is preferred to neutralize the product to a pH of about 9.0 or 9.5.

If desired, the phenol sulfonic acid may be prepared by sulfonation of phenol prior to the reaction. When this is done, phenol is reacted, as conventionally done, with sulfuric acid at a temperature of 80° to 110° C. for from about ½ to 2 hours to obtain essentially phenol monosulfonic acid. A small excess in the range of 10 to 20% of sulfuric acid is generally used. At the relatively low reaction temperatures, essentially monosulfonic acid is obtained so that the excess sulfuric acid functions mainly to accelerate the rate of reaction. After the reaction, the excess sulfuric acid is neutralized and the phenol sulfonic acid is converted to the sodium salt with an alkali, preferably sodium hydroxide, prior to reaction with the formaldehyde.

To obtain the desired fluid loss properties, it is essential that the phenol sulfonic acid sodium salt be pre-reacted with the formaldehyde and then reacted with additional phenol in the proper proportion of from 0.5 to 0.7 moles of phenol per mole of phenol sulfonic acid in the presence of some free or unreacted formaldehyde. After the reaction of the free formaldehyde remaining in the reaction mixture or added with the phenol and the second caustic addition, the reaction mixture must be heated until a cloud point is obtained before the addition of the third or additional portions of caustic is made. After all of the additions of alkali, the reaction is continued until a viscosity of at least 30 cps is obtained for the reaction mixture when cooled to 25° C. The reaction can be continued if desired, until the viscosity is up to about 600 cps or higher. However, at the high viscosities a portion of the resins may become insoluble.

The reaction mixture is generally carried out in an aqueous medium with concentration of the ingredients being such that the reaction mixture will contain from about 35 to 55 weight percent solids. Preferably the reaction mixture is maintained in the range of 45 to 50%. At the higher concentration, the rate of reaction increases. Reaction mixtures above 55% concentration may also be used except that the viscosity of the reaction mixture increases making this undesirable. Also at concentrations over 50%, a small amount of some insoluble resin may be formed. While operative, concentrations below 35% generally require considerably longer reaction times.

The fluid loss control agent is used in the drilling fluid in amounts effective for fluid loss control. The amounts used can be widely varied and generally are in the range commonly used for fluid loss agents depending upon the particular drilling fluid used and other agents added. In salt saturated muds, the amounts commonly used are in the range of from 3 to 15 pounds per barrel. The fluid loss control agent may be used with weighing agents, thinners, and other additives generally used in the various drilling fluids. The addition of the water loss agent may be made at any time except that the pH of the drilling fluid at the time of addition should preferably be at a pH in the range of 8 to 9.5, if the additive is to be used in the drilling fluids under high temperatures and pressures in large amounts. Also, exposure of the drilling fluids for extended periods of time at a pH over 11 at high temperatures may deteriorate the fluid loss control properties of the product under high temperature and high pressure tests which is not noted under standard API testing procedures.

The following Examples further illustrate the invention.

EXAMPLE I

A fluid loss control agent was prepared using a sodium salt of p-phenol sulfonic acid. In 244 grams of water, 196 grams (0.84 moles) of p-phenol sulfonic acid sodium salt dihydrate was dissolved and 102 grams of a 50% formaldehyde solution was added. To the mixture, 10 grams of sodium hydroxide was slowly added as a 50% solution and the mixture heated slowly to reflux and refluxed for about five hours. The mixture was cooled to room temperature, and after adding 47 grams of phenol as a 50% solution, the mixture was refluxed for an additional 40 minutes prior to cooling to 90° and the addition of a second portion of 20 grams of 50% caustic. After refluxing the mixture further for 50 minutes, the resin became cloudy and had a viscosity of around 15 cps at 25° C. A third portion of 20 grams of 50% sodium hydroxide solution was added after cooling to 90°, and the reaction mixture refluxed for an additional seven hours at which time the product had a viscosity of 445 cps at 25° C. A portion of the reaction mixture was pan dried in four hours at 65° C. for use in mud tests.

The above product was tested as a fluid loss control agent in a number of different drilling fluids. The fresh water base drilling fluid was prepared by mixing high-yield and low-yield bentonite clays to obtain a low-solids drilling fluid containing about 8% solids. The base drilling fluid, upon mixing, had a FANN Viscometer reading of 44 at 600 rpm.

In determining the fluid loss for a fresh water drilling fluid, the fluid loss control agent was added to the base mud in a determined amount of pounds per barrel and the mixture adjusted to pH 9 after which it was mixed for from 10 to 15 minutes. After mixing, the pH was adjusted again and an initial fluid loss determination made using procedures similar to the API Standard Test Procedure for fluid loss. After making the initial fluid loss determination, the drilling fluid was hot rolled at 150° F. for a specified period of time, cooled to room temperature, the pH adjusted to 9.5, and again tested for fluid loss. The base mud had a standard drilling fluid loss of 13.4 ml in 30 minutes. However, with the addition of 2 pounds per barrel of the pan dried additive, the fluid loss was decreased to 10.3 ml, and with 5 pounds per barrel of the additive the fluid loss was reduced to 8.2 ml.

The additive was also tested as a fluid loss agent in a saturated salt drilling fluid. The saturated salt water mud was prepared by mixing into 350 ml of distilled water, 4 grams of high-yield bentonite sold under the trademark of AQUAGEL, 12 grams of low-yield bentonite sold under the trademark of BAROCO CLAY, and 12 grams of clay sold under the trademark of GRUNDITE BOND. The clays, upon being added to the distilled water, were mixed for about 20 minutes at which time the FANN Viscometer reading of the mixture was in the range of 6 to 8 at 600 rpm. After the mixing and partial hydration of the clay, 125 grams of sodium chloride was added and the mixture mixed for an additional five minutes.

In performing the water loss test for saturated salt water drilling fluid, the additive was added to the saturated salt base mud prepared as described above in an amount of 6 pounds per barrel and the mixture mixed for 10 minutes while the pH was adjusted to 9. After mixing, the drilling fluid with the additive was hot rolled for 20 hours, cooled to room temperature and tested for water loss. The water loss obtained was 13.8 ml in 30 minutes. A commercial fluid loss control agent sold under the trademark of RESINEX had a water loss above 100 ml in a similar drilling fluid.

The saturated salt drilling fluid was also aged at 300° F. for 16 hours after hot rolling and then again tested. The fluid loss obtained after aging was 19.2 ml.

Fluid loss determinations were also made for gypsum, calcium chloride, and sea water drilling fluids. In preparation of the gypsum drilling fluid, 4 pounds per barrel of gypsum were added to the fresh water base mud described above and for the calcium chloride contaminated mud, 2 pounds of calcium chloride per barrel were added to the base mud.

The sea water drilling fluid was prepared following a procedure similar to that described for preparation of the fresh water base mud where high-yield and low-yield bentonites were hydrated by mixing with water, except that instead of using water, the mud is prepared using a synthetic sea water obtained by adding 42 grams of synthetic sea salt per liter of water.

The fluid loss determinations for the above latter drilling fluids were made after the drilling fluids had been hot rolled for 20 hours at 150° F. and also after aging at 300° F. or 350° F. for 16 hours. The drilling fluids were thinned with 6 pounds per barrel of a ferrochrome lignosulfonate drilling fluid conditioner prior to additions of the fluid loss agent. The water loss results obtained were compared to the water loss obtained after an additional 6 pounds of the ferrochrome lignosulfonate were added to the drilling fluid to function as a fluid loss agent and also when RESINEX fluid loss control agent was used. The fluid loss for the sea water drilling fluid was also tested at high temperature and pressure after the drilling fluid had aged at 300° F. for 16 hours. These tests were carried out at 300° F. and 500 pounds per square inch pressure differing from the standard API procedure of room temperature and 100 pounds per square inch pressure. The results are shown in the table below.

TABLE I

DRILLING FLUIDS CONTAINING 6 lbs/bbl OF FERROCHROME LIGNOSULFONATE

| | | Fluid Loss, mls. | | | | | | |
|---|---|---|---|---|---|---|---|---|
| | | Gyp Contaminated | | CaCl₂ Contaminated | | Sea Water Mud | | |
| Fluid Loss Agent | Amt. Agent Added lbs/bbl | After Hot Roll at 150° F. 20 Hours | After Aging at 350° F. 16 Hours | After Hot Roll at 150° F. 20 Hours | After Aging at 300° F. 16 Hours | After Hot Roll at 150° F. 16 Hours | After Aging at 300° F. 16 Hours | HT.-HP.* |
| None | — | 17.0 | 17.4 | 15.4 | 29.6 | 17.0 | 28.4 | 56.0 |
| Example I Product | 6 | 6.6 | 7.6 | 7.4 | 9.3 | 5.2 | 7.2 | 21.6 |
| RESINEX | 6 | 6.6 | 8.4 | 6.8 | 12.6 | — | — | — |
| Additional Ferrochrome Lignosulfonate | 6 | 6.4 | 7.0 | 9.0 | 16.0 | 6.0 | 26.8 | 46.0 |

*Fluid loss determined at 300° F. and 500 PSI

EXAMPLE II

A second sample of the water loss agent was prepared using a procedure similar to that above except that less formaldehyde was used and also a small portion of formaldehyde was added near the end of the main reaction to increase the reaction rate of final polymerization.

To 599 grams of water, 495 grams (2.1 moles) of the sodium salt of phenol sulfonic acid containing 2 moles of water of hydration per mole of phenol sulfonic acid salt were dissolved in the water and 215 grams of a 46% solution of formaldehyde and 63 grams of 50% caustic were added. The mixture was heated to reflux and refluxed for five hours, after which 119 grams of phenol with an equal amount by weight of water were added and the mixture refluxed for an additional 40 minutes. The second portion of sodium hydroxide in an amount of 51 grams of a 50% sodium hydroxide solution was slowly added, and the mixture refluxed for an additional 40 minutes until the resin became cloudy. The third portion of 50 grams of 50% sodium hydroxide was slowly added and then 51 grams of 23% formaldehyde was slowly added over a one-hour period while the mixture was being refluxed. The mixture was then refluxed overnight at which time the viscosity of the mixture was 31 cps at 25° C. After refluxing for an additional four hours, the final viscosity was 35 cps and the pH of the solution was 11.9. The product was spray dried after cooling.

The product prepared above was tested as a fluid loss control agent in saturated salt drilling fluid and compared to a pregelatinized starch product sold commercially as a fluid loss control agent under trademark IMPERMEX, a resin sold commercially under trademark RESINEX, and an acid-condensed phenol sulfonic acid-formaldehyde polymer of the type described in U.S. Pat. No. 2,681,312. The phenol sulfonic acid-formaldehyde acid-condensed polymer was prepared in a manner similar to that of Example No. 27 of the patent. The product was prepared by reacting 94 grams of phenol with 167 grams of 98% sulfuric acid at 100° for 30 minutes to sulfonate the phenol. After the sulfonation, the product was cooled and 90 grams of 40% formaldehyde and 232 grams of water were added. The mixture was warmed to 85° and held at 85° until a viscosity of approximately 95 cps was reached, after which it was diluted with 300 grams of water and neutralized slowly with 270 grams of 40% sodium hydroxide. The pH of the final mixture was about 9.4 and had a viscosity of 24 cps at 25° C.

The results obtained are shown in Table II below.

TABLE II

| Fluid Loss Agent | Amt. Agent Added lbs/bbl | Fluid Loss, mls. After 20 Hr. Hot Roll at 150° F. | After Aging 16 Hr. at 300° F. |
|---|---|---|---|
| Example II | 3 | 25.0 | 25.8 |
|  | 6 | 13.3 | 10.0 |
|  | 9 | 6.7 | 7.6 |
|  | 6 | — | 9.6* |
| Pregelatinized Starch | 3 | 75.0 | 110.0 |
|  | 6 | 8.4 | 105.0 |
|  | 12 | 2.0 | 124.0 |
| RESINEX | 6 | 110.0 | — |
| Acid Condensed Phenol Sulfonic Acid-Formaldehyde | 6 | 79.0 | 97.0 |
| Control | — | 110.0 | 116.0 |

*Aged at 425° F. for 16 hours

EXAMPLE III

A fluid loss control agent was prepared by starting with the sulfonation of phenol to obtain the phenol sulfonic acid salt.

To 159 grams of phenol, 203 grams of 98% sulfuric acid was slowly added and the mixture warmed and maintained at a temperature of about 100° to 160° C. for about one hour. The reaction mixture was then cooled to about 70°, diluted with 206 grams of water, and neutralized by slowly adding 228 grams of 50% sodium hydroxide solution. After the neutralization, the product was cooled to room temperature. Formaldehyde in an amount of 214 grams of 42.9% solution was then added and the mixture refluxed for 4½ hours after which 94 grams of phenol with 94 grams of water were added and the reaction mixture refluxed for 40 additional minutes before the second portion of alkali was added. After the second portion of the sodium hydroxide in an amount of 40 grams as a 50% solution was added, the reaction mixture became cloudy upon 15 minutes of further refluxing. The third portion of caustic in an amount of 40 grams of a 50% solution was then added and the refluxing continued for a total of about 12¾ hours with a total of 200 grams of dilution water being added in four increments of 50 grams each. The first increment of dilution water was added after 7 hours of refluxing, the second after about 9½ hours, the third after 12½ hours and the last at the end of the reaction. The final product had a viscosity of 401 cps at 25° C. at 47.3% total solids content.

The fluid loss properties of the above-prepared product were tested in a saturated salt mud under high temperature and pressure and compared to a product which was prepared in a manner similar to that above except that the phenol sulfonic acid salt was not pre-reacted with formaldehyde. The product prepared without pre-reaction of the sulfonated phenol with formaldehyde was made by adding 101.4 grams of 98% sulfuric acid to 79.4 grams of phenol and reacting the mixture for about one hour at 100° C. After the reaction the mixture was cooled to 70°, the mixture was diluted with 103 grams of water, and slowly neutralized with 114 grams of a 50% sodium hydroxide solution. To the neutralized reaction mixture at about 70°, 180 grams of 42.9% formaldehyde solution and 47 grams of phenol with an equal weight of water were added. The reaction mixture was then refluxed for about 40 minutes before the second portion of sodium hydroxide in an amount of 20 grams of a 50% solution was added. After an additional hour of refluxing a third portion of caustic in an amount of 20 grams of a 50% solution was added with 50 grams of additional water. An additional 50 grams of water was added after about 30 minutes of further refluxing and shortly thereafter the viscosity of the reaction mixture at 25° C. was 385 cps at which time the mixture was allowed to cool.

The results obtained are shown in Table III below.

TABLE III

| | Saturated Salt Drilling Fluid | | |
|---|---|---|---|
| | | Fluid Loss, mls. at 300° F., 500 PSI | |
| Fluid Loss Agent | Amt. Agent Added lbs/bbl | After Hot Rolling 20 Hours | After Aging 16 Hr. at 300° F. |
| Control | — | over 200 | — |
| Example III | 9 | 24* | 22 |
| Product | 12 | 19 | 20 |
| Phenol Sulfonic Acid Salt Not Pre-reacted with Formaldehyde | 9 | over 200 | — |

*Hot Rolled for 2 hours

What is claimed is:

1. A water-base drilling, workover or completion fluid composition comprising a suspension of clayey material in an aqueous medium and an effective amount of a fluid loss control agent to control fluid loss, said fluid loss control agent being a water-soluble sulfonated phenol-formaldehyde-phenol resin prepared by
(a) reacting phenol sulfonic acid with formaldehyde in an aqueous medium at a pH in the range of 8 to 9.5 until from about 0.9 to 1.3 moles of formaldehyde per mole of phenol sulfonic acid has reacted with the phenol sulfonic acid,
(b) adding phenol to the pre-reacted mixture in a mole ratio of 0.5 to 0.7 moles of phenol per mole of phenol sulfonic acid and reacting the resulting mixture in the presence of formaldehyde and additional alkali until a cloud point is obtained at a pH in the range of 10 to 11, said formaldehyde being present in the resulting mixture in an amount such that the mole ratio of the sum of formaldehyde present in the resulting reaction mixture and the formaldehyde reacted with the phenol sulfonic acid is in the range of from 1 to 1.6 per mole of the sum of the phenol sulfonic acid and the added phenol,
(c) adding additional alkali and continuing the reaction at a pH in the range of 11 to 12 until the viscosity of the final reaction mixture is at least 30 cps at a solids concentration of about 45 to 50% at 25° C.

2. A composition according to claim 1 wherein the drilling fluid is a saturated salt drilling fluid.

3. A composition according to claim 1 wherein the drilling fluid is a sea water drilling fluid.

4. A composition according to claim 1 wherein in the preparation of the fluid loss control agent the amount of formaldehyde present in the resulting mixture is such that the mole ratio of the sum of the formaldehyde present in the resulting mixture and the formaldehyde reacted with phenol sulfonic acid is in the range of 1.1 to 1.3 per mole of phenol sulfonic acid and phenol used.

5. A composition according to claim 1 wherein the fluid loss control agent is prepared by reacting the final reaction mixture until the viscosity of the final reaction mixture is in the range of 30 to 600 cps at 25° C.

6. A water-base drilling, workover or completion fluid composition comprising a suspension of clayey material in an aqueous medium and an effective amount of a fluid loss control agent to control fluid loss, said fluid loss control agent being a water-soluble sulfonated phenol-formaldehyde-phenol resin prepared by
(a) reacting phenol sulfonic acid with formaldehyde in an aqueous medium at a pH in the range of 8 to 9.5 until from about 0.9 to 1.3 moles of formaldehyde per mole of phenol sulfonic acid has reacted with the phenol sulfonic acid,
(b) adding phenol to the pre-reacted mixture in a mole ratio of 0.5 to 0.7 moles of phenol per mole of phenol sulfonic acid and reacting the resulting mixture in the presence of free formaldehyde until the major portion of the free formaldehyde has reacted, said free formaldehyde being present in an amount such that the mole ratio of the sum of formaldehyde reacted with the phenol sulfonic acid and the free formaldehyde is in the range of from 1 to 1.6 per mole of the phenol sulfonic acid and the added phenol,
(c) adding alkali to the resulting reaction mixture to raise the pH to a range of 10 to 11 and continuing the reaction until a cloud point is obtained,
(d) adding additional alkali to obtain a pH in the range of 11 to 12 and continuing the reaction until the viscosity of the final reaction mixture is at least 30 cps at a solids concentration of about 45 to 50% at 25° C.

7. A composition according to claim 6 wherein in the preparation of the fluid loss control agent the amount of formaldehyde present in the resulting mixture is such that the mole ratio of the sum of the formaldehyde present in the resulting mixture and the formaldehyde reacted with the phenol sulfonic acid is in the range of 1.1 to 1.3 per mole of phenol sulfonic acid and phenol used.

8. A composition according to claim 7 wherein the final reaction mixture is reacted until the viscosity of the final reaction mixture is in the range of 30 to 600 cps.

9. A composition according to claim 8 wherein the drilling fluid is a saturated salt drilling fluid.

10. A composition according to claim 8 wherein the drilling fluid is a sea water drilling fluid.

11. A water-base drilling, workover or completion fluid composition comprising a suspension of clayey material in an aqueous medium and an effective amount of a fluid loss control agent to control fluid loss, said fluid loss control agent being a water-soluble sulfonated phenol-formaldehyde-phenol resin prepared by
(a) reacting phenol sulfonic acid with formaldehyde in an aqueous medium at a solids concentration in the range of 35 to 55 weight percent at a pH in the range of 8 to 9.5 at a temperature in the range of 85° to 105° C. for from two to eight hours,
(b) adding phenol to the pre-reacted mixture in a mole ratio of 0.5 to 0.7 moles of phenol per mole of phenol sulfonic acid and reacting the phenol-containing reaction mixture for from ¼ to 2 hours at a temperature of 85° to 105° C.,
(c) adding a second portion of alkali to the mixture to obtain a pH in the range of from 10 to 11 and heating the mixture an additional ¼ to 2 hours until a cloud point is obtained,
(d) adding additional alkali to obtain a pH in the range of 11 to 12 and reacting the final mixture at a temperature in the range of 85° to 105° C. until the viscosity of the final reaction mixture is at least 30 cps at 25° C. for a solids concentration of from about 45 to 50 weight percent.

12. A composition according to claim 11 wherein the fluid loss control agent is prepared by reacting the phenol sulfonic acid sodium salt with formaldehyde at a solids concentration in the range of 45 to 50% for from 4 to 6 hours and wherein the phenol-containing mixture is reacted for from ½ to 1 hour prior to addition of the second portion of alkali to obtain a pH in the range of 10.2 to 10.8 and wherein the final reaction mixture is reacted at a pH in the range of 11.2 to 12 until the viscosity of the final reaction mixture is in the range of 30 to 600 cps.

13. A composition according to claim 12 wherein the drilling fluid is a saturated salt drilling fluid.

14. In a process of drilling a well which comprises steps of performing a drilling operation in the well with a tool and circulating a fluid in the well while performing such operations, the improvement comprising circulating in said well the fluid of claim 1.

15. In a process of drilling a well which comprises steps of performing a drilling operation in the well with a tool and circulating a fluid in the well while performing such operations, the improvement comprising circulating in said well the fluid of claim 4.

16. In a process of drilling a well which comprises steps of performing a drilling operation in the well with a tool and circulating a fluid in the well while performing such operations, the improvement comprising circulating in said well the fluid of claim 6.

17. In a process of drilling a well which comprises steps of performing a drilling operation in the well with a tool and circulating a fluid in the well while performing such operations, the improvement comprising circulating in said well the fluid of claim 8.

18. In a process of drilling a well which comprises steps of performing a drilling operation in the well with a tool and circulating a fluid in the well while performing such operations, the improvement comprising circulating in said well the fluid of claim 9.

19. In a process of drilling a well which comprises steps of performing a drilling operation in the well with a tool and circulating fluid in the well while performing such operations, the improvement comprising circulating in said well the fluid of claim 12.

* * * * *